July 27, 1937.  L. LUDWIG  2,087,918
COMBINATION ELECTRIC SERIES AND SERIES-PARALLEL CONNECTERS
Filed April 8, 1933
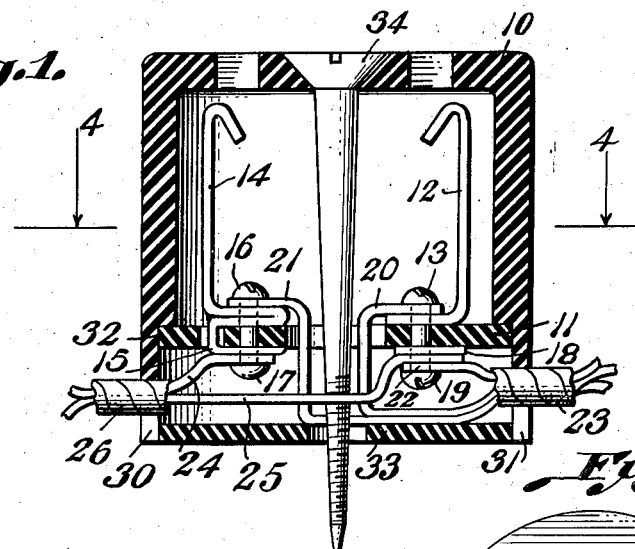
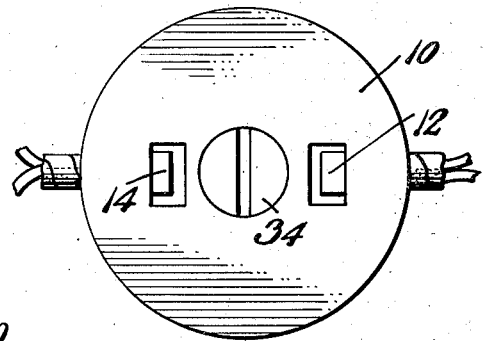
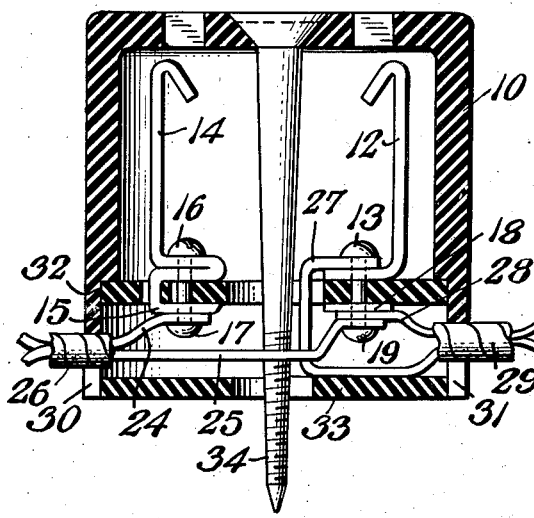
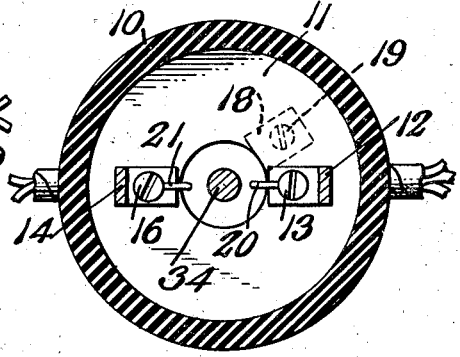
Inventor:
Louis Ludwig,
by ............
Attorney.

Patented July 27, 1937

2,087,918

UNITED STATES PATENT OFFICE 2,087,918

COMBINATION ELECTRIC SERIES AND SERIES-PARALLEL CONNECTERS

Louis Ludwig, Brooklyn, N. Y.

Application April 8, 1933, Serial No. 665,092

1 Claim. (Cl. 173—334)

The invention relates to electric connecters and has for its main object to provide means in such devices whereby two or more electric appliances may be connected to a source of electric current either in series or in series-parallel connection with each other. Another object is to so construct these means that they will not change the general appearance of the device nor materially add to its cost.

These and other objects and advantages will be readily understood from the following description and from the accompanying drawing of a preferred embodiment of the invention, in which, however, modifications may be made without departing from the scope of the appended claim.

In the drawing,

Fig. 1 is a cross-sectional side elevation of a device made in accordance with my invention and showing the wires connected in series-parallel with the contact blades of the device;

Fig. 2 is a similar view showing the wires connected in series with the contact blades;

Fig. 3 is a top view of Fig. 2; and

Fig. 4 is a cross-sectional view, taken on line 4—4 in Fig. 1.

Referring now to all the views, the device consists of a housing 10 in which an insulating washer 11 is secured. A contact blade 12 is secured on top of the washer by means of a screw 13. Another contact blade 14 is secured on top of the washer and formed in one piece with a contact member 15, which is bent in underneath the washer, as plainly shown in Figs. 1 and 2. A screw 16 is threaded in the upper part of the blade 14, while a screw 17 is threaded into the part 15. A contact member 18 is secured under the washer 11 by means of a screw 19. This washer, as well as the screw 19, is insulated from the blade 12 and the screw 13, by means of the washer.

In Fig. 1, three wires 20, 21 and 22 are shown connected respectively to the screws 13, 16 and 19. These wires are contained in a cord 23. Any appliance or appliances connected to these wires will be in series-parallel with any appliance connected with the blades 12 and 14, when the line wires 24 and 25, of the cord 26, are connected to the screws 17 and 19, respectively.

In Fig. 2, two wires 27 and 28, of a cord 29, are connected, respectively, to the screws 13 and 19, while the line wires 24 and 25 are connected to the screws 17 and 19. Any appliance connected to the wires 27 and 28 will be in series with any appliance connected with the blades, when the device is wired as just described.

The cords which carry the respective wires pass through openings 30 and 31 which are formed on opposite sides in the bottom of the housing. The washer 11 abuts against a shoulder 32, formed in the interior of the housing, and another washer 33 is preferably inserted in the extreme bottom of the housing. The whole device is secured to any suitable support by a screw 34 which passes axially through the housing and the washers 11 and 33.

It will be noted that with a device constructed in the manner described and illustrated, it is a simple matter to make all the wire connections to the parts on the washer 11, as this may be done with the washer completely removed from the housing. After all the connections have been made, the housing is placed over the washer and secured to the support, on which used, by means of the screw 34.

Having described my invention and its objects, what I claim as new and wish to protect by Letters Patents is:

An electric connecting device comprising, an insulating washer, a pair of spaced contact blades secured on said washer, one of said contact blades having two wire terminals one of which is located on top of said washer and the other one at the bottom thereof, the other contact blade provided with one wire terminal secured on top of the washer, another separate wire terminal secured on the bottom of the washer, binding screws associated with all of said terminals whereby wires may be connected to form a circuit in series-parallel or in series with the circuit which may be connected to the contact blades, a housing securable over all of said parts after all the wire connections have been made and having an annular shoulder fitting over the insulating washer, a pair of spaced openings formed in the housing through which a pair of contact prongs may be inserted to contact with the said contact blades, and a central opening formed through the housing and through the washer through which a securing member may be inserted to secure the device to a support.

LOUIS LUDWIG.